(12) United States Patent
Reid et al.

(10) Patent No.: US 7,458,830 B2
(45) Date of Patent: Dec. 2, 2008

(54) CONNECTOR SYSTEM

(75) Inventors: Gavin Reid, Campbell, CA (US); Chris Ligtenberg, San Carlos, CA (US); Bartley K. Andre, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/933,055

(22) Filed: Oct. 31, 2007

(65) Prior Publication Data

US 2008/0064238 A1    Mar. 13, 2008

Related U.S. Application Data

(60) Continuation of application No. 11/736,475, filed on Apr. 17, 2007, now Pat. No. 7,374,437, which is a division of application No. 11/241,578, filed on Sep. 30, 2005, now Pat. No. 7,244,129.

(51) Int. Cl.
*H01R 13/44* (2006.01)

(52) U.S. Cl. .................................................. 439/131

(58) Field of Classification Search ............... 439/131, 439/137, 138, 142, 660
See application file for complete search history.

(56) References Cited

U.S. PATENT DOCUMENTS

| | | | | |
|---|---|---|---|---|
| 5,183,404 | A * | 2/1993 | Aldous et al. | 439/55 |
| 5,336,099 | A * | 8/1994 | Aldous et al. | 439/131 |
| 5,562,504 | A | 10/1996 | Moshayedi | |
| 5,634,802 | A | 6/1997 | Kerklaan | |
| 6,089,922 | A | 7/2000 | Glad et al. | |
| 6,093,038 | A * | 7/2000 | Chen et al. | 439/131 |
| 6,290,517 | B1 * | 9/2001 | Anderson | 439/131 |
| 6,482,019 | B1 * | 11/2002 | Lo Forte et al. | 439/131 |
| 7,244,129 | B2 * | 7/2007 | Reid et al. | 439/131 |
| 7,374,437 | B2 * | 5/2008 | Reid et al. | 439/131 |
| 2001/0019907 | A1 * | 9/2001 | Glad et al. | 439/131 |
| 2006/0030184 | A1 | 2/2006 | Sasaki | |

* cited by examiner

*Primary Examiner*—Gary F. Paumen
(74) *Attorney, Agent, or Firm*—Sawyer Law Group LLP

(57) ABSTRACT

An electronic device including a movable hatch with an integrated connector system that moves between an open and closed position. The connector system includes one or more connector receptacles that are hidden within the electronic device when the hatch with integrated connector system is in the closed position. The connector receptacles are exposed for use when the hatch with integrated connector system is in the open position.

8 Claims, 7 Drawing Sheets

100

100

CONNECTOR SYSTEM

CROSS-REFERENCE TO RELATED APPLICATIONS

This application is a continuation of application Ser. No. 11/736,475, filed Apr. 17, 2007, which is a divisional of U.S. Pat. No. 7,244,129, filed on Sep. 30, 2005. This application is also related to application Ser. No. 11/932,984, entitled "Method And System For Connecting An External Cable To A Device", filed on even date herewith.

FIELD OF DISCLOSURE

The present invention relates generally to computers, and more particularly to a connection system.

BACKGROUND

Connection systems are well known and include electrical contacts that enable devices to communicate with other devices. For example, connection systems may include Universal Serial Bus (USB) ports, FireWire ports, RJ-11 ports, and RJ-45 ports.

Mobile devices such as notebook computers are becoming increasingly thinner. As a result, connection systems need to be reduced in size to accommodate smaller form factors. A problem when reducing the size of a connection system is that the reduction is limited by the size of the largest port. For example, RJ-45 ports are relatively large and thus may be a challenge to accommodate.

BRIEF SUMMARY

A connection system is disclosed. The connection system includes a connection receptacle comprising a first component coupled to a chassis and a second component coupled to the first component. The first and second components are collapsed into a compact configuration when the connection receptacle is in a closed position. According to the system and method disclosed herein, implementing the receptacle as two separate components allows for a compact connection system.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

The present invention relates to computers, and more particularly to a connection system. The following description is presented to enable one of ordinary skill in the art to make and use the invention and is provided in the context of a patent application and its requirements. The present invention is not intended to be limited to the embodiments shown, but is to be accorded the widest scope consistent with the principles and features described herein.

A connection system is disclosed. The connection system includes a connection receptacle that is implemented as two separate components. One of the components is fixed in that it is coupled to the chassis, and the other component is rotatable or coupled to a moving mechanism. The combination of the fixed and rotating components are adapted to receive a plug when the connection receptacle is in an open position, and the fixed and rotating components are collapsed into a compact configuration when the connection receptacle is in a closed position. This collapsing function enables a substantial reduction in the size of the connection system and thereby enables a substantial reduction in the form factor of a device implementing the connection system. To more particularly describe the features of the present invention, refer now to the following description in conjunction with the accompanying figures.

Although the present invention disclosed herein is described in the context of notebook computers, the present invention may apply to other types of devices, and still remain within the spirit and scope of the present invention.

Figure 1:
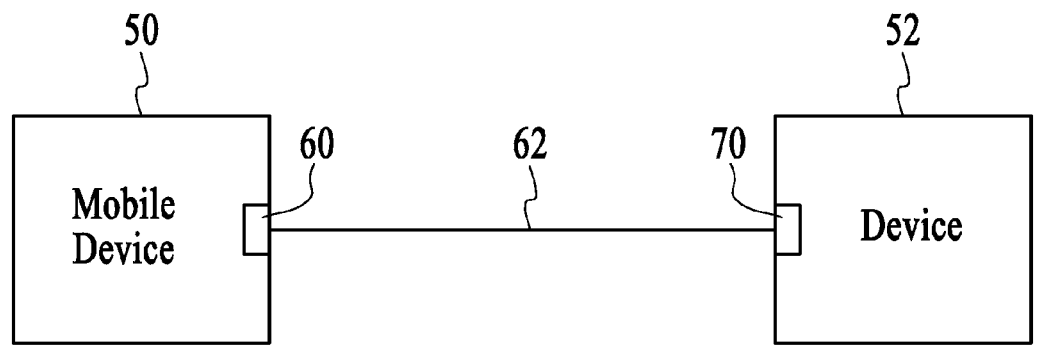
FIG. 1 is a block diagram of a mobile device that is connected to another device.

FIG. 1 is a block diagram of a mobile device 50 that is connected to another device 52, in accordance with the present invention. The mobile device 50 includes a connection system 60 that couples to an external cable 62, which couples to a connection system 70 of the device 52.

Figure 2A:
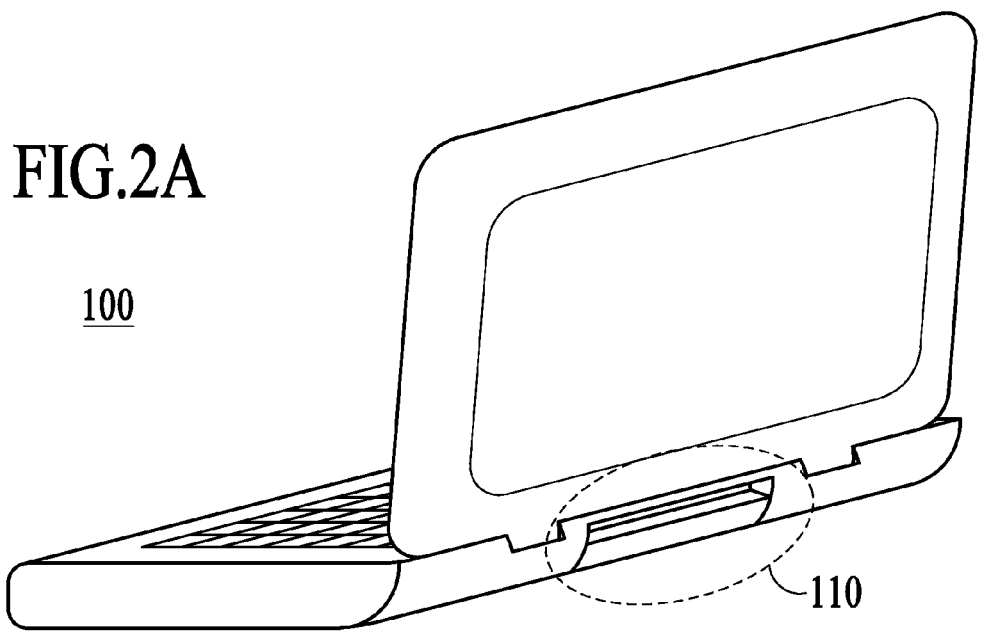
FIGS. 2A and 2B are perspective-view diagrams of a mobile device, which may be used to implement the mobile device of FIG. 1.
Figure 2B:
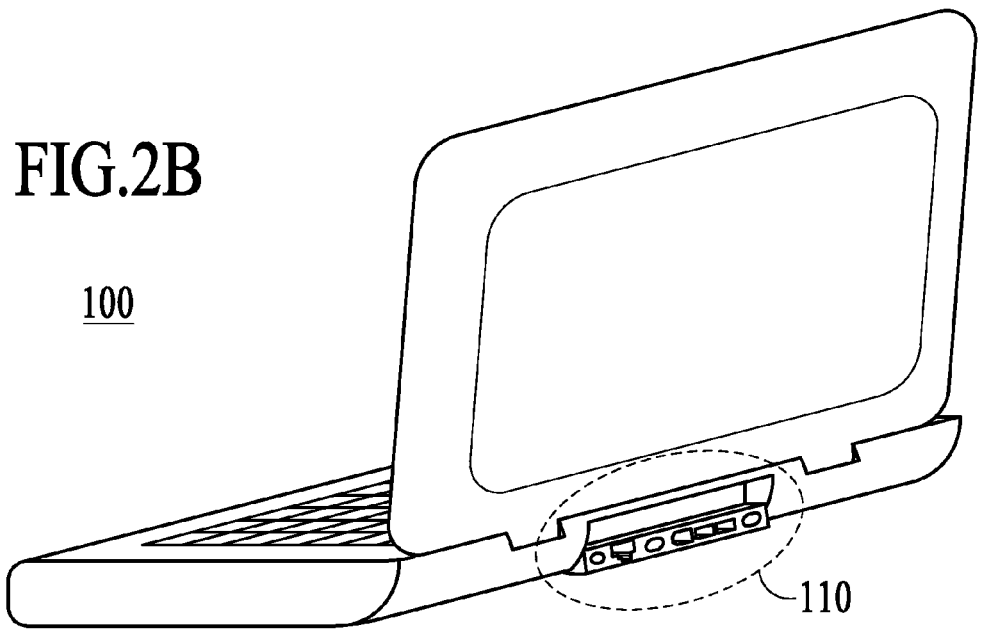

FIGS. 2A and 2B are perspective-view diagrams of a mobile device 100, which may be used to implement the mobile device 50 of FIG. 1, in accordance with the present invention. The mobile device 100 includes a connection system 110 that has a stowed or closed position (FIG. 2A) and an open position (FIG. 2B). When in an open position, the connection system 110 is configured to couple one or more external cables (e.g., the external cable 62 of FIG. 1) to an internal cable (not shown) and/or a printed circuit board (not shown).

Figure 3:
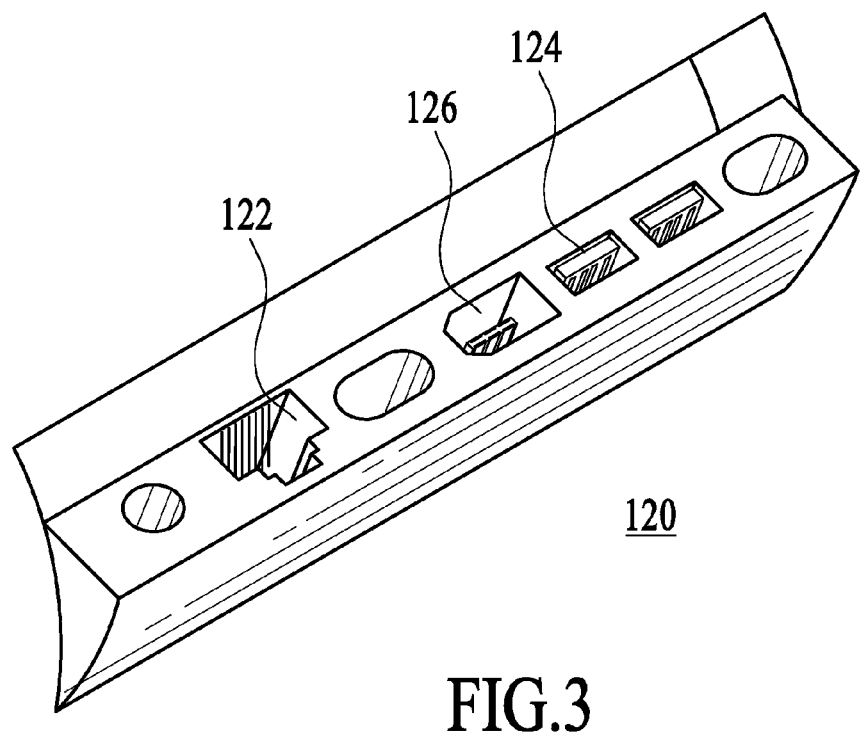
FIG. 3 is a perspective-view diagram of a connection system, which may be used to implement the connection system of FIG. 2.
Figure 4:
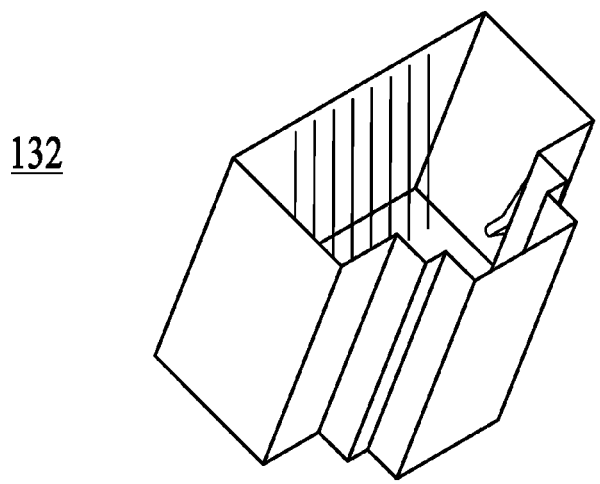
FIGS. 4, 5, and 6 are perspective-view diagrams of a conventional RJ-45 port, a conventional USB port, and a conventional FireWire port, which may be used to implement the RJ-45, USB, and FireWire ports of FIG. 3, respectively.
Figure 5:
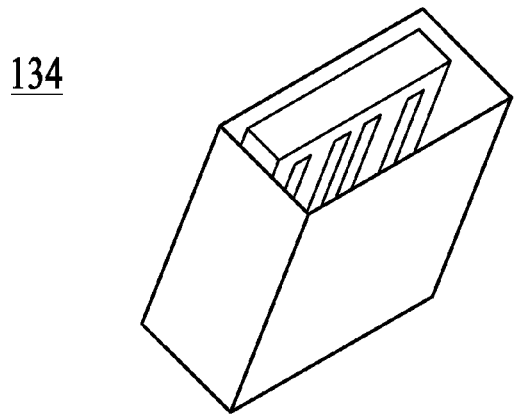
Figure 6:
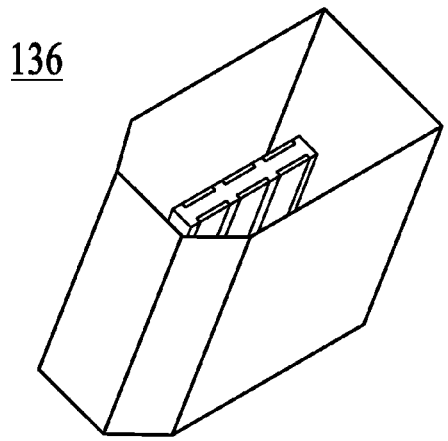

FIG. 3 is a perspective-view diagram of a connection system 120, which may be used to implement the connection system 110 of FIG. 2, in accordance with the present invention. The connection system 120 includes multiple connector receptacles, or ports, such as an RJ-45 port 122, a universal serial bus (USB) port 124, a FireWire port 126 etc. FIGS. 4, 5, and 6 are perspective-view diagrams of a conventional RJ-45 port 132, a conventional USB port 134, and a conventional FireWire port 136, which may be used to implement the RJ-45, USB, and FireWire ports 122, 124, and 126 of FIG. 3, respectively. The specific number of ports and the specific types of port will vary, depending on the specific implementation. For example, another implementation may also include an RJ-11 port (not shown).

Referring again to FIG. 3, the ports maintain their original form whether the connection system 120 is in an open or in a closed position. When the connection system 110 swings to the closed or stowed position (FIG. 2A), the ports (e.g., 122-126) also swing into a stowed position such that they are flush with the mobile device chassis. Although the present invention disclosed herein is described in the context of multiple ports integrated into the connection system 120, the present invention may apply to other configurations, and still remain within the spirit and scope of the present invention. For example, each port (e.g., the RJ-45 port 122) can be separate from other ports such that a single port can be moved into open and closed positions independent from other ports.

Figure 7A:
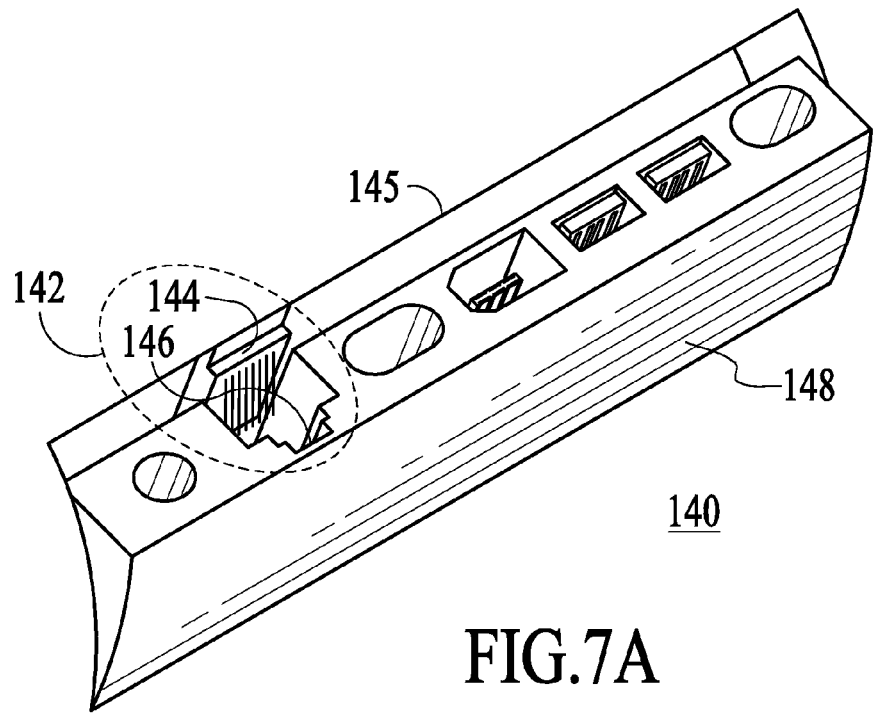
FIGS. 7A and 7B are perspective-view diagrams of a connection system, which may be used to implement the connection system of FIGS. 2A and 2B.
Figure 7B:
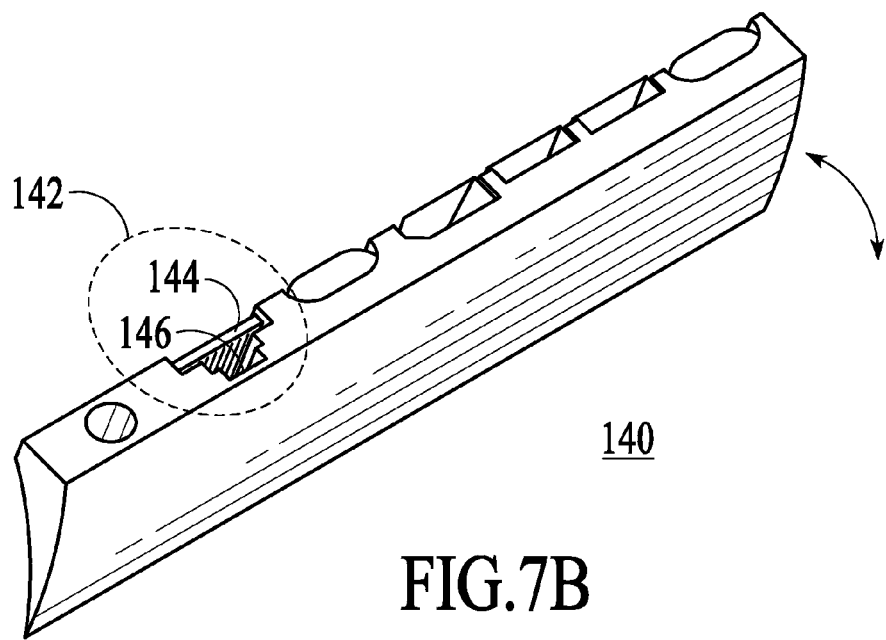
Figure 8A:
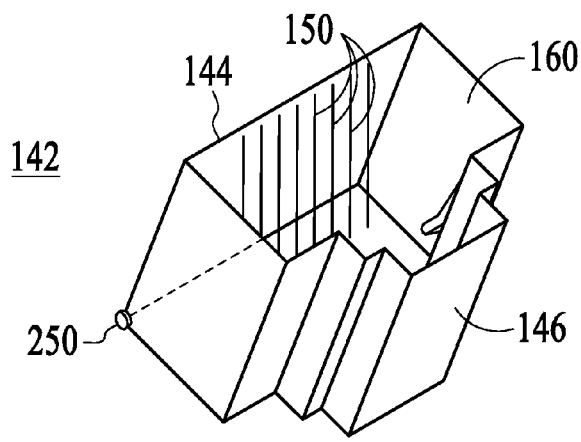
FIGS. 8A and 8B are perspective-view diagrams of a connection receptacle of FIGS. 7A and 7B, where the connection receptacle is in an open position, and in a closed position, respectively.
Figure 8B:
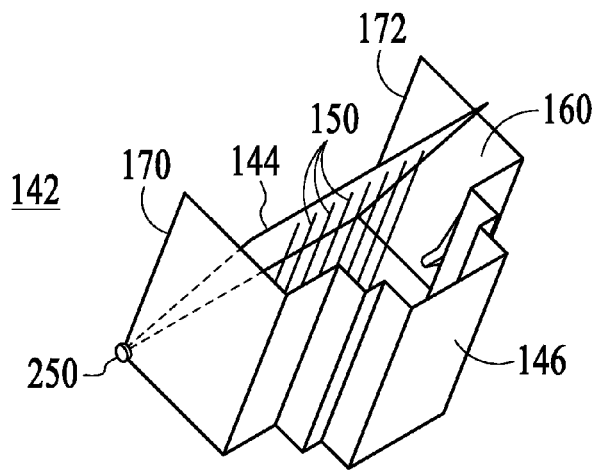

FIGS. 7A and 7B are perspective-view diagrams of a connection system 140, which may be used to implement the connection system 110 of FIGS. 2A and 2B, in accordance with the present invention. In accordance with the present invention, the connection system 140 includes a connector receptacle 142 that is implemented as two separate components: a fixed component 144 that is coupled to a portion of the mobile device chassis 145 and a rotating component 146 that is coupled to a connection system frame 148. In this specific embodiment, the connector receptacle 142 is implemented as an RJ-45 port. The connector receptacle 142 is accessible to a user when the connection system 140 is in an open position (FIG. 7A) such that an external cable (i.e., a plug of a cable) may be inserted into the connector receptacle 142. The connector receptacle 142 is in a closed or stowed position when the connection system 140 is in a closed position. FIG. 7B shows the connector receptacle 142 in a partially closed position to show the movement of the rotating component 146 relative to the fixed component 144. FIGS. 8A and 8B are perspective-view diagrams of the connection receptacle 142 of FIGS. 7A and 7B, where the connection receptacle 142 is in an open position, and in a closed position, respectively, in accordance with the present invention.

As described above, although the present invention disclosed herein is described in the context of multiple ports integrated into the connection system 140, the present invention may apply to other configurations, and still remain within the spirit and scope of the present invention. For example, each port (e.g., the RJ-45 port 142, as well as the USB and FireWire ports described below) can be separate from other ports such that a single port can be moved into open and closed positions independent from other ports.

The fixed component 144 of the connector receptacle 142 houses electrical contacts 150, which provide an interconnected electrical path into the mobile device, without any required service loop, since the electrical component of the connector receptacle 142 is static. In an alternative embodiment, the connector receptacle can be positioned such that the rotating component 146 houses the electrical contacts 150.

In accordance with the present invention, as the connection receptacle 142 swings towards a closed position (FIG. 8B), the rotating component 146 folds into the fixed component 144. More specifically, the rotating component 146 moves toward the fixed component 144 such that a cavity 160, which is adaptable to receive a plug, contracts. As a result, when the connection receptacle 142 is in a closed position, the fixed and rotating components 144 and 146 are collapsed into a compact configuration. Accordingly, the amount of space used by the connector receptacle 142 is substantially reduced.

In accordance with the present invention, as the connection receptacle 142 swings towards an open position (FIG. 8A), the rotating component 146 rotates away from the fixed component 144. More specifically, the rotating component 146 moves away from the fixed component 144 such that the cavity 160 expands to a shape where the cavity 160 is adapted to receive a plug. As a result, the fixed and rotating components 144 and 146 are adapted/positioned to receive a plug when the connection receptacle 142 is in an open position.

While conventional connection systems often have hatches that cover or hide the ports, typically for cosmetic reasons, the connection system has a valuable function of stowing the connector receptacle 142 and any other mounted ports. Because the fixed and rotating components 144 and 146 of the connector receptacle 142 can collapse, less space inside the mobile device chassis is required when the fixed and rotating components 144 and 146 are in a stowed position. By minimizing the space requirements of the stowed position, larger ports such as standard RJ-45 ports no longer limit the potential reduction in connection systems. Accordingly, this collapsing function enables a substantial reduction in the size of the connection system and thereby enables a substantial reduction in the form factor of a device implementing the connection system. For example, a notebook computer may have a highly tapered chassis shape.

Referring again to FIGS. 8A and 8B, to compensate for tolerance, the rotating component 146 has side components 170 and 172 that continuously overlap components of the fixed component 144. The side components 170 and 172 function as guides to center the rotating component 146 relative to the fixed component 144 as the rotating component 146 moves toward or away from the fixed component 144. This ensures that the fixed and rotating components 144 and 146 are properly aligned to receive a plug. The fixed component 144 is preferably not fully fastened until the side components 170 and 172 center the fixed component 144.

Figure 9:
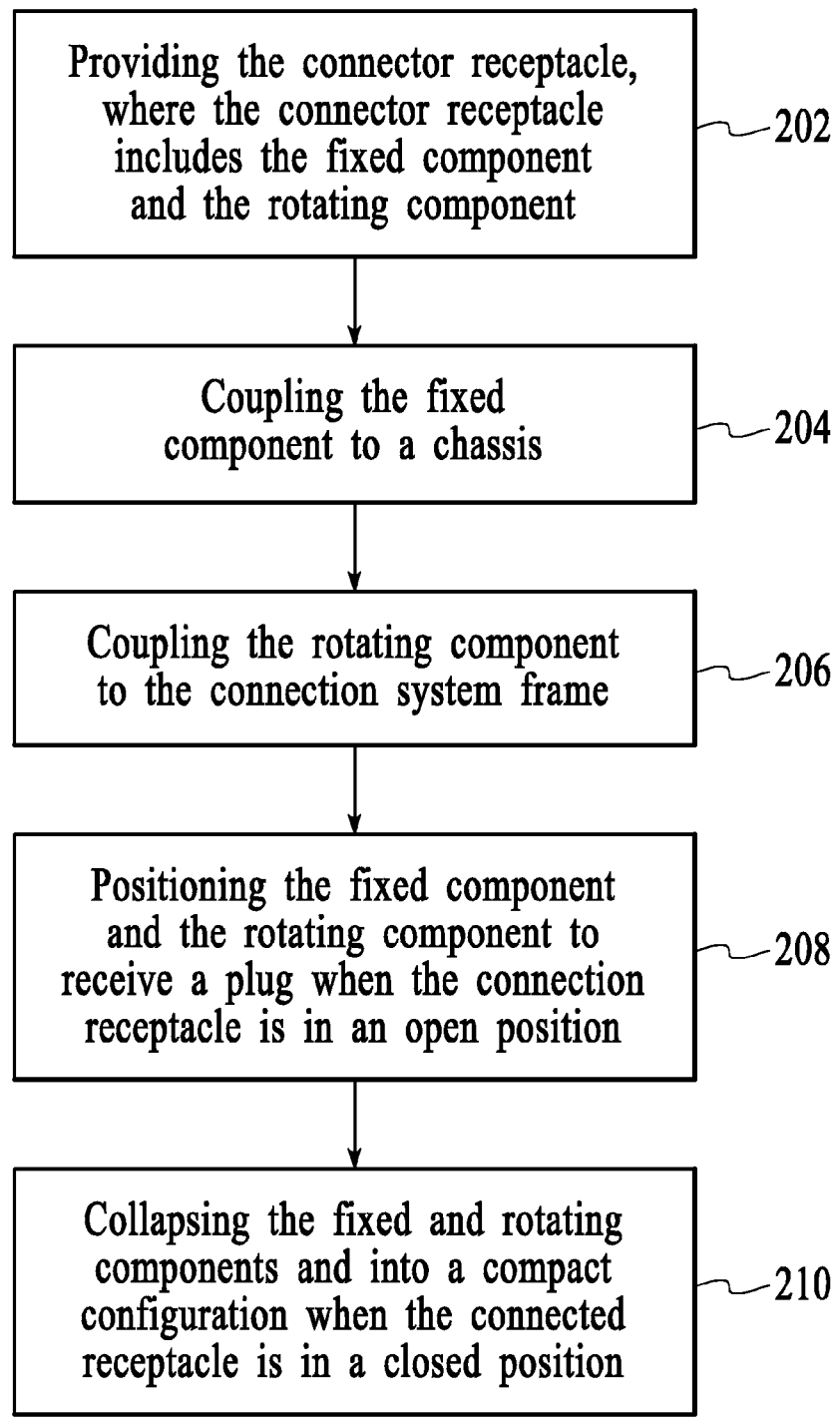
FIG. 9 is a flow chart showing a method of providing the connection receptacle of FIGS. 8A and 8B.

FIG. 9 is a flow chart showing a method of providing the connection receptacle 142 of FIGS. 8A and 8B, in accordance with the present invention. Referring to FIGS. 9, 8A, and 8B, together, the process begins in a step 202 where the connector receptacle 142 is provided. The connector receptacle 142 includes the fixed component 144 and the rotating component 146. In a step 204, the fixed component 144 is coupled to a mobile device chassis. In a step 206, the rotating component 146 is coupled to the connection system frame. Alternatively, the rotating component is movably coupled to the chassis. The steps 204 and 206 are not order dependent. In a step 208, the fixed component 144 and the rotating component 146 are positioned to receive a plug when the connection receptacle 142 is in an open position. In a step 210, the fixed and rotating components 144 and 146 are collapsed into a compact configuration when the connection receptacle 142 is in a closed position. The steps 208 and 210 are not order dependent.

Figure 8C:
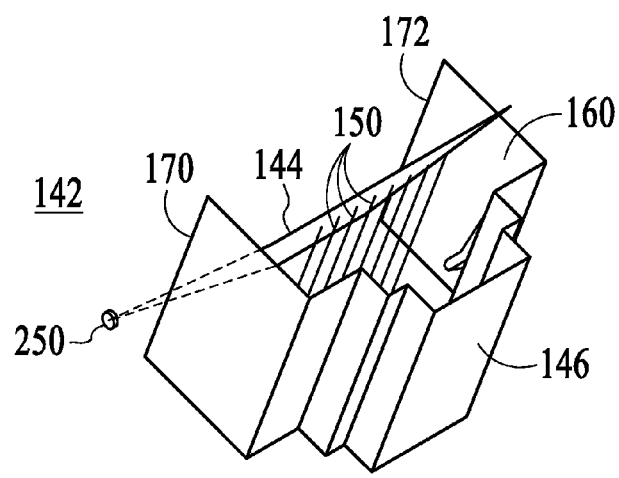
FIG. 8C is a perspective-view diagram of a connection receptacle of FIGS. 7A and 7B, in accordance with another embodiment.

In accordance with the present invention, the position of the fixed and rotating components 144 and 146 relative to a pivot point 250 of the connection receptacle 142 are such that when the connection receptacle 142 is in a closed position (FIG. 8B), the rotating component 146 is substantially parallel to exposed portions of the electrical contacts 150 of the fixed component 144. This ensures that the electrical contacts 150, being fragile, are not damaged by the rotating component 146 when the connection receptacle 142 closes. The specific position of the pivot point 250 may vary and will depend on the specific implementation. For example, the pivot point 250 may be positioned anywhere within the connector cavity 160 as shown in FIGS. 8A and 8B. Alternatively, the pivot point 250 may be positioned elsewhere outside of the connector cavity 160. FIG. 8C is a perspective-view diagram of a connection receptacle where the pivot point 250 is positioned outside of the connector cavity 160, in accordance with another embodiment of the present invention. In a specific embodiment, the connector system also includes an integral rejection component for rejecting certain types of plugs such as RJ-11 plugs.

Although the present invention disclosed herein is described in the context of an RJ-45 port, the present invention may apply to other types of ports, and still remain within the spirit and scope of the present invention. For example, the connector receptacle 142 described above would also apply to an RJ-11 port such that when the connector receptacle is in an open position, the connector receptacle is configured to receive an RJ-11 plug.

Figure 10A:
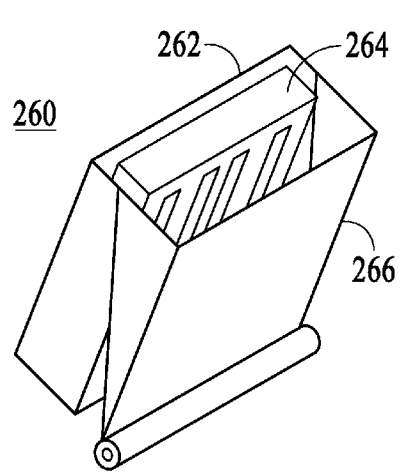
FIGS. 10A and 10B are perspective-view diagrams of a connection receptacle, which may be used in the implementation of the connection system of FIG. 2, in accordance with one embodiment.
Figure 10B:
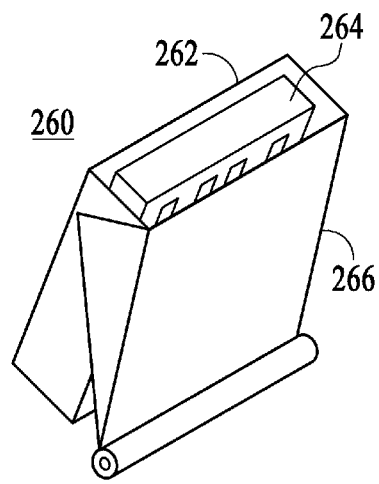

FIGS. 10A and 10B are perspective-view diagrams of a connection receptacle 260, which may be used in the implementation of the connection system 110 of FIG. 2, in accordance with one embodiment of the present invention. FIGS. 10A and 10B illustrate the connection receptacle 260 in an open position and in a closed position, respectively. The connection receptacle 260 functions similarly to the connection receptacle 142 of FIGS. 7A to 9 except that connection receptacle 260 is applied to a USB port instead of an RJ-45 port. Also, in this specific embodiment, the connection receptacle 260 is implemented as three separate components: a fixed component 262 that is coupled to a portion of a mobile device chassis, an insulator post 264, and a rotating component 266 that is coupled to a connection system frame. In one embodiment, the insulator post 264 is also coupled to the mobile device chassis or alternately to the fixed component 262. In another embodiment, the insulator post 264 is coupled to the connection system frame or alternatively to the rotating component 266. The insulator post 264 preferably floats as the first and second components 262 and 266 move toward the compact configuration. Alternatively, the insulator post 264 may also be in a fixed position as the fixed and rotating components 262 and 266 move towards the compact configuration. Electrical contacts may be coupled to either the insulator post 264, the fixed component 262, or the rotating component 266.

Figure 11A:
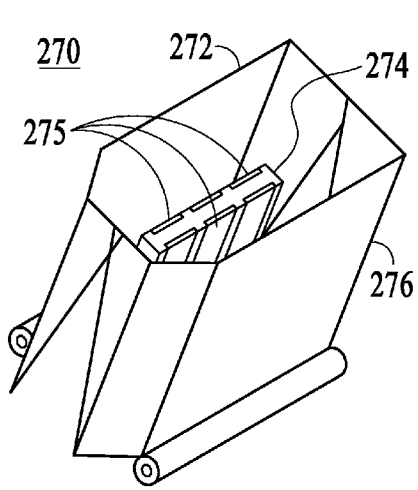
FIGS. 11A and 11B are perspective-view diagrams of a connection receptacle, which may be used in the implementation of the connection system of FIG. 2, in accordance with one embodiment.
Figure 11B:
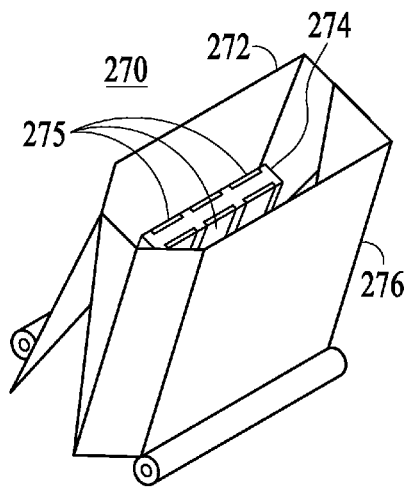

FIGS. 11A and 11B are perspective-view diagrams of a connection receptacle 270, which may be used in the implementation of the connection system 110 of FIG. 2, in accordance with one embodiment of the present invention. FIGS. 11A and 11B illustrate the connection receptacle 270 in an open position and in a closed position, respectively. The connection receptacle 270 functions similarly to the connection receptacle 142 of FIGS. 7A to 9 except that connection receptacle 270 is applied to a FireWire port instead of an RJ-45 port. Also, in this specific embodiment, the connection receptacle 270 is implemented as three separate components: a first component 272 that is coupled to a portion of the mobile device chassis, an electrical post 274 having electrical contacts 275, and a second component 276 that is coupled to the connection system frame. In one embodiment, the electrical post 274 is also coupled to the mobile device chassis or alternatively to the first component 272. In another embodiment, the electrical post 274 is coupled to the connection system frame or alternatively to the second component 276. The electrical post 274 preferably floats as the first and second components move toward the compact configuration. The electrical post 274 may alternatively be in a fixed position as the first and second components move toward the compact configuration. If the electrical post 274 is fixed, both the first component 272 and the second component 276 preferable move toward the electrical post 274 as the first and second components 274 and 276 move toward the compact configuration. Alternatively, one of the first and second components 274 and 276 may remain in a fixed position as the first and second components 274 and 276 move toward the compact configuration.

According to the system and method disclosed herein, the present invention provides numerous benefits. For example, the collapsing function of the connection receptacle enables a substantial reduction in the size of a connection system and thereby enables a substantial reduction in the form factor of a device implementing the connection system.

A connection system has been disclosed. The connection system includes a connection receptacle that is implemented as two separate components. One of the components is fixed in that it is coupled to the chassis, and the other component is rotatable. The combination of the fixed and rotating components are adapted to receive a plug when the connection receptacle is in an open position, and the fixed and rotating components are collapsed into a compact configuration when the connection receptacle is in a closed position. This collapsing function enables a substantial reduction in the size of the connection system and thereby enables a substantial reduction in the form factor of a device implementing the connection system.

The present invention has been described in accordance with the embodiments shown. One of ordinary skill in the art will readily recognize that there could be variations to the embodiments, and that any variations would be within the spirit and scope of the present invention. Accordingly, many modifications may be made by one of ordinary skill in the art without departing from the spirit and scope of the appended claims.

What is claimed is:

1. An electronic device comprising:
a chassis of the electronic device; and
an integrated connection system that moves between an open and a closed position, the integrated connection system including a plurality of connector receptacles at least one of the plurality of connector receptacles having a first component coupled to the chassis and a second component coupled to the first component, the integrated connection system being hidden within the electronic device and the at least one or more connector receptacles being collapsed when the integrated connector system is in the closed position, the integrated connection system receptacles being exposed for use and the at least one or more connector receptacles configured to receive a plug when the integrated connection system is in the open position.

2. The electronic device of claim 1, wherein at least one of the plurality of connector receptacles remains uncollapsed when the integrated connection system is in the closed position.

3. The electronic device of claim 1, wherein the at least of the plurality of connector receptacles that is collapsible, collapses independently from the plurality of connector receptacles.

4. The electronic device of claim 1, wherein at least two of the plurality of connector receptacles are collapsible, at least one of which comprises a first component that is decoupled from the chassis.

5. The electronic device of claim 1, wherein the integrated connection system is flush with the chassis when in the closed position.

6. The electronic device of claim 1, wherein the integrated connection system is permanently attached to the electronic device.

7. The electronic device of claim 1, wherein the electronic device comprises a laptop computer.

8. A method of reducing a size of connector receptacles of an electronic device, the method comprising:
- disposing a plurality of connector receptacles on an integrated connection system that moves between an open and a closed position;
- coupling a first component of at least one of the plurality of connector receptacles to a chassis of the electronic device;
- coupling a second component coupled to the first component, the integrated connection system being hidden within the electronic device and the at least one or more connector receptacles being collapsed when the integrated connection system is in the closed position, the integrated connection system receptacles being exposed for use and the at least one or more connector receptacles configured to receive a plug when the integrated connection system is in the open position.

* * * * *